May 12, 1953     J. T. PETERSON     2,638,298
TRIPOD HEAD
Filed April 19, 1948
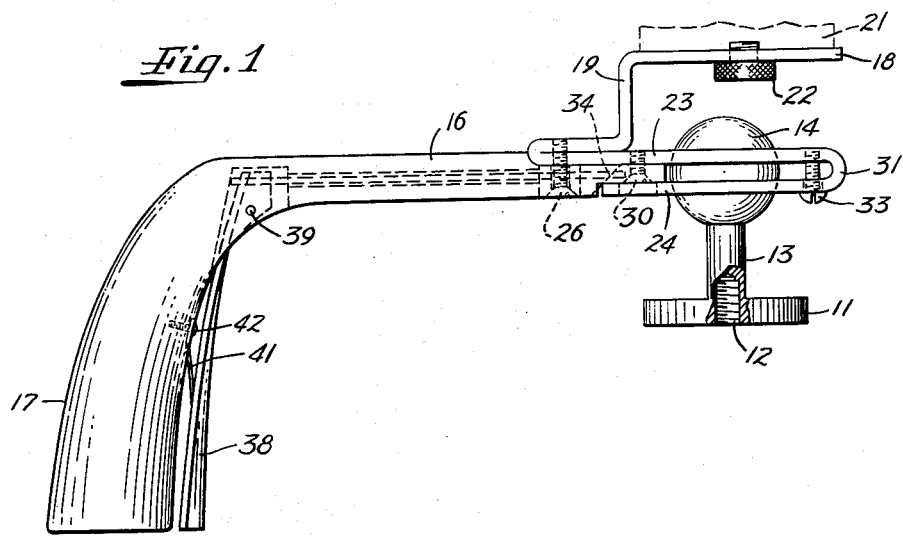
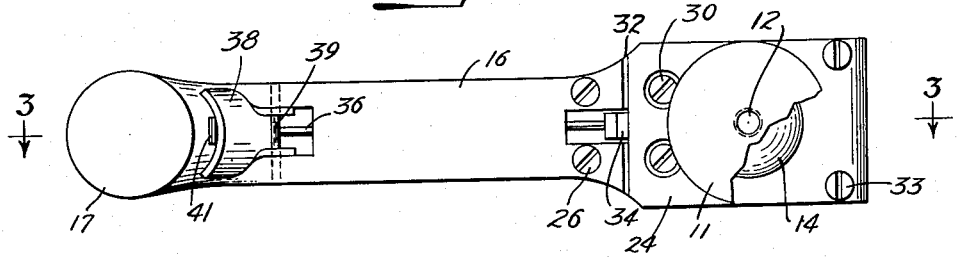
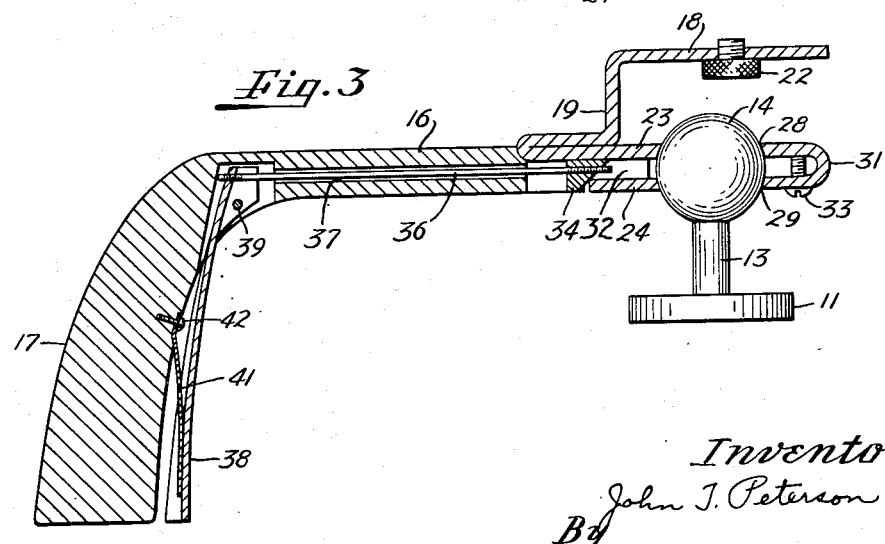
Inventor
John T. Peterson
By McCanna and Morsbach
Attys.

Patented May 12, 1953

2,638,298

UNITED STATES PATENT OFFICE 2,638,298

TRIPOD HEAD

John T. Peterson, Rockford, Ill.

Application April 19, 1948, Serial No. 21,979

8 Claims. (Cl. 248—181)

This invention relates to instrument mounts and more particularly to mounts providing for universal movement of a supported instrument or the like.

An object of the invention is the provision in a mount of the above character comprising a handle mechanism mounted on a ball connection of novel clamping means for fixedly securing the handle mechanism in a desired adjusted position relative to the ball connection.

Another object of the invention is the provision in a mount of the above character of novel means for selectively securing the clamping means in a fixed position with the ball connection or releasing the clamping means so that the handle mechanism is movable universally relative to the ball connection.

Another object of the invention is the provision in a mount of the above character of a novel mechanism for selectively releasing the clamping means or securing the handle mechanism in a fixed position relative to a ball connection, that is operable by the manipulation of a single lever mechanism.

Another object of the invention is to provide a mount of the above character with novel clamping means that is operative to clamp the ball tighter when the center of gravity of the handle mechanism and supported load is off-center with respect to the ball.

Another object of the invention is to provide a mount of the above character which is simple in construction, which is positive in its action, and which is relatively inexpensive to manufacture.

Other objects and advantages of the invention will become apparent from the following detailed description taken in connection with the accompanying drawings, in which—

Figure 1 is a side elevation view of a mount embodying the present invention;

Fig. 2 is a bottom view of Figure 1, and

Fig. 3 is a sectional view taken substantially along the line 3—3 of Fig. 2.

Referring now to the drawings the invention is shown embodied in an instrument mount comprising a ball connection adapted to be connected to a support, such as a tripod, and a handle mechanism mounted on the ball connection for universal movement and shaped to support an instrument such as a camera, binoculars, telescope and the like.

In the particular embodiment of the invention the numeral 11 indicates a plate adapted to fit on the top of a conventional tripod and having a threaded aperture 12 for the reception of a tripod screw, not shown, projecting outwardly from the top of the tripod. A stem 13 extends upwardly from the plate 11 and a ball or sphere 14 is rigidly mounted at the upper end of the stem in spaced relation with the plate 11.

The handle mechanism comprises, in general, a handle 16 which constitutes the frame of the handle mechanism terminating in a pistol grip 17, a platform 18 or mount mounted on the handle 16, by a bracket 19, and shaped to support an instrument 21 (a fragmentary portion only being shown), a thumb screw 22 extending through the platform 18 to secure the instrument to the platform 18 and spaced leaf springs 23 and 24 engageable with the ball 14 on opposite sides of a plane passing through the center of the ball.

The leaf springs 23 and 24 are formed herein by the leg portions of a resilient spring member bent back on itself and secured to the handle 16 as by screws 26. The leaf springs are formed with openings 28 and 29, respectively, shaped to receive the ball 14. The openings are of smaller diameter than the maximum diameter of the ball 14. The side walls defining the respective openings 28 and 29 are shaped in general to conform generally to the surface of the ball as best seen in Fig. 3. At one side of the ball the leaf springs 23 and 24 are interconnected by a bridging portion 31. On the opposite side of the ball 14 spacers 32, secured to the leaf spring 23 as by screws 30, maintain the leaf springs 23 and 24 in spaced relation. The leaf springs are normally biased into tight frictional engagement with the ball by screws 33. The latter extend through openings in the leaf spring 24 and are threaded into the leaf spring 23 so that tightening the screws pulls the leaf springs together.

A wedge 34 is mounted on the handle 16 to be inserted between the ends of the leaf springs 23 and 24, adjacent the end of the handle, to release the clamping pressure applied by the leaf springs to the ball 14 so that the handle mechanism may be moved relative to the ball. For this purpose the wedge 34 is mounted on the threaded end of an elongated rod 36 extending through an axially extending bore 37 formed in the handle 16. The threaded connection permits easy assembly of the respective parts and also permits of adjusting the position of the wedge 34 with respect to the leaf springs 23 and 24. A lever 38, pivotally mounted on the underside of the handle 16 by a pin 39, engages the end of the rod 36 opposite the wedge 34. The pin 39 is positioned so that clockwise rotation of the lever 38, as effected when the operator of the mount squeezes the lever 38 and the pistol grip 17, causes the wedge 34 to be moved axially and forced between the leaf springs 23 and 24 to cause the leaf springs to be spread apart. Such spreading releases the gripping or clamping pressure exerted by the leaf springs 23 and 24 on the ball 14. A spring 41 normally biases the lever 38 to its forward position so that the wedge 34 is in a retracted position such as shown in Fig. 3. At one end the spring is mounted by a pin 42 to the forward side of the pistol grip 17 and at its opposite end engages the rearward side of the lever 38 to urge the latter to its forward position. The lever 38 and the pistol grip 17 may be curved or rounded, as best seen in Fig. 2, so as to conveniently fit in the operator's hand.

The platform 18, bracket 19 and the leaf springs 23 and 24 may be formed from a single piece of material pre-shaped as shown to facilitate manufacture or the respective parts may be formed as separate parts.

The operation of the instrument mount can best be understood by reference to Figures 1 and 3. An instrument is secured to the platform 18 by a thumb screw 22. The screws 33 are adjusted so that the leaf springs 23 and 24 exert a clamping pressure on the ball in a manner to securely fix the position of the handle mechanism relative to the ball. Since on one side of the ball 14, the bridging portion 31 separates the leaf springs 23 and 24 and on the opposite side of the ball the spacers 32 separate the leaf springs, tightening of the screws 33 urges the central portion of the leaf springs 23 and 24 toward each other into tighter engagement with the ball 14. This inward movement of the leaf springs causes the inner portions of the side walls defining the openings 29 to be forced into tighter frictional engagement with the surface of the ball 14 than the outer portions of the side walls. This is advantageous in that any off-center weight on the platform 18 which would cause the handle mechanism to be moved relative to the ball 14 causes these edge portions engaging the ball to be moved into tighter frictional engagement with the ball and thus positively prevent any undesired movement of the handle mechanisms relative to the ball 14. To move the mounted instrument, so as to point it in a particular direction, the operator grasps the pistol grip 17 and squeezes his hand so as to pull the lever 38 toward the pistol grip 17. This movement of the lever forces the wedge 34 between the springs 23 and 24 and causes the latter to be spread apart thereby relieving the clamping pressure on the ball 14 so that the handle mechanism may be moved universally relative to the ball 14. With proper adjustment of the parts very little movement of the lever 38 and the wedge 34 is required to effect a release of the clamping pressure. When the instrument has been properly directed the operator releases the lever 38 and the action of the spring 41 moves the lever so that the wedge 34 is retracted from between the leaf springs 23 and 24 to the position shown in the figures and the spring members again grip the ball 14 so that the handle mechanism is fixedly secured thereto.

I claim:

1. In combination, a ball adapted for connection to a support, an instrument support means mounted on said ball for universal movement including spaced members engageable with said ball on opposite sides of a plane passing through the center of the ball, one of said members being normally urged toward the other, said members being movable between a position in which said members grip said ball to hold said means in fixed relation to the ball and a position in which said means is free to move universally of the ball and a movable wedge mounted on said support means and shaped to be inserted between said members for moving the members to the latter position.

2. In combination, a ball arranged to be attached to a support, an instrument mount, instrument support means including spaced members disposed on opposite sides of a plane passing through the center of the ball, one of said members forming a mounting for said instrument mount, said members being formed with apertures for receiving said ball, said apertures having a diameter smaller than the maximum diameter of the ball, and being defined by surfaces complementary to the periphery of the ball, one of said members being resilient and biased toward the other to urge the side walls of the apertures to grip the ball and movable to a position in which the members are free to move relative to the ball, and wedge means mounted on said instrument support means to be insertable between said members for moving said one member to the last-mentioned position.

3. In an instrument support, a platform for mounting an instrument, a ball adapted to be attached to a support, opposed members biased into engagement with said ball on opposite sides of a plane passing through the center of the ball and maintainable in a fixed position with said ball, one of said members being rigid with said platform, said members being movable relative to each other and being interconnected at one side of the ball, and manually operable wedge means on the opposite side of the ball insertable between said members for moving said members relative to each other to effect disengagement from the ball to permit said platform to move universally with respect to said ball.

4. In combination, a platform for mounting an instrument, a sphere adapted to be rigidly mounted, instrument support means including a first member engageable with said sphere on one side of a plane passing through the center of the sphere and providing a mounting for said platform, and a second member engageable with said sphere on the opposite side of said plane, one of said members being resilient and normally biased to coact with said other member to apply a clamping pressure for positively locking the members relative to the sphere, means for adjusting the clamping pressure, and a wedge mounted on said instrument support means and insertable between said members for spreading them apart to release the clamping pressure applied to said ball to permit said platform to move universally with respect to said sphere.

5. In an instrument support, the combination of a platform for mounting an instrument, a handle rigid with said platform, a sphere adapted to be secured to a support, spaced members engageable with said sphere on opposite sides of a plane passing through the center of the sphere, said members being interconnected on one side of the sphere and one of said members being resilient and normally stressed to coact with said other member to apply a clamping pressure for positively locking the members in a desired position relative to the sphere, the other of said members being fixedly secured to the handle on the opposite side of said sphere and wedge means mounted adjacent said members and insertable between said members on the side of the sphere away from the connection between the members for flexing the resilient member to release the clamping pressure between said members whereby the platform is movable universally of the sphere.

6. In an instrument support, the combination of a ball arranged to be mounted on a support, opposed members engageable with said ball on opposite sides of a plane passing through the center of the ball and biased to engage the ball in a clamping relation and to be held in fixed relation thereto, one of said members being resilient and flexible relative to said other member for releasing the clamping pressure between said members, a handle rigid with one of said members, a wedge movably mounted on said handle for insertion between said opposed members, a pivotally mounted lever on said handle for moving said wedge between said opposed members, and spring means for biasing said lever to a position in which said wedge is normally in a retracted position with respect to said members.

7. In an instrument support, a ball arranged to be attached to a support, spaced members disposed on opposite sides of a plane passing through the center of the ball, said members being formed with openings for receiving said ball, said openings having a diameter smaller than the maximum diameter of the ball, the side walls of said members defining said openings shaped to conform to the surface of the ball, at least one of said members being in the form of a leaf spring the thickness of which is small compared with the radius of the ball so that the ball projects through the spring a substantial distance, said member being biased to a position in which the side walls defining said openings of the spaced members are in tight frictional engagement with the ball and movable to a position in which the members are free to move relative to the ball, and means for moving the members to the last mentioned position.

8. In an instrument support, the combination of a handle, a platform fixed to the handle for mounting an instrument, a ball arranged to be mounted on a support, a leaf spring having a reversed bend intermediate its ends to form opposed members disposed in spaced face to face relationship having approximately coaxial openings for the reception of the ball and engageable with said ball on opposite sides of a plane passing through the center of the ball and maintainable in fixed position with the ball, means for fixedly securing one end of the leaf spring to the handle, the other end of said leaf spring being movable to flex said members to engage and disengage the ball, wedge means insertable between said opposed members to flex said members and release the ball, a lever mounted on said handle for actuating said wedge means and means for adjusting the spring tension between the opposed members.

JOHN T. PETERSON.

References Cited in the file of this patent

UNITED STATES PATENTS

| Number | Name | Date |
|---|---|---|
| 658,911 | Hall | Oct. 2, 1900 |
| 856,610 | Steindorf | June 11, 1907 |
| 1,435,182 | Shaw | Nov. 14, 1922 |
| 2,128,046 | Heil | Aug. 23, 1938 |
| 2,424,499 | Pasturczak | July 22, 1947 |

FOREIGN PATENTS

| Number | Country | Date |
|---|---|---|
| 83,914 | Austria | May 10, 1921 |